(12) United States Patent  
Hand

(10) Patent No.: US 11,614,130 B2
(45) Date of Patent: Mar. 28, 2023

(54) DYNAMIC CONTROLLABLE DOG CLUTCH

(71) Applicant: Means Industries, Inc., Saginaw, MI (US)

(72) Inventor: Joshua D. Hand, Midland, MI (US)

(73) Assignee: Means Industries, Inc., Saginaw, MI (US)

( * ) Notice: Subject to any disclaimer, the term of this patent is extended or adjusted under 35 U.S.C. 154(b) by 0 days.

(21) Appl. No.: 17/572,131

(22) Filed: Jan. 10, 2022

(65) Prior Publication Data

US 2022/0235829 A1     Jul. 28, 2022

Related U.S. Application Data

(60) Provisional application No. 63/141,575, filed on Jan. 26, 2021.

(51) Int. Cl.
    *F16D 27/108*     (2006.01)
    *F16D 11/14*     (2006.01)
    *F16D 11/00*     (2006.01)

(52) U.S. Cl.
    CPC ............ *F16D 27/108* (2013.01); *F16D 11/14* (2013.01); *F16D 2011/006* (2013.01)

(58) Field of Classification Search
    None
    See application file for complete search history.

(56) References Cited

U.S. PATENT DOCUMENTS

| | | | |
|---|---|---|---|
| 796,205 A * | 8/1905 | Graham et al. | F16D 11/14 |
| | | | 192/69.62 |
| 10,107,340 B1 * | 10/2018 | Samie | F16D 27/108 |
| 10,590,999 B2 | 3/2020 | Kimes | |
| 10,677,296 B2 | 6/2020 | Kimes et al. | |
| 10,781,891 B2 | 9/2020 | Kimes et al. | |
| 10,968,964 B2 | 4/2021 | Hand | |
| 2013/0256078 A1 * | 10/2013 | Kimes | F16D 11/14 |
| | | | 192/69 |
| 2015/0308518 A1 * | 10/2015 | Stocker | F16D 27/118 |
| | | | 192/69.6 |
| 2017/0114839 A1 * | 4/2017 | Zhong | F16D 23/06 |
| 2019/0170198 A1 * | 6/2019 | Kimes | F16H 63/304 |
| 2021/0246950 A1 | 8/2021 | Pawley et al. | |

* cited by examiner

*Primary Examiner* — Timothy Hannon
(74) *Attorney, Agent, or Firm* — Reising Ethington P.C.

(57) ABSTRACT

A dynamic controllable dog clutch (DCDC) includes a pocket plate, a notch plate, and a linear actuator having a stator and a translator. The translator is axially movable between (i) an engaged position in which a locking member axially extends through the a pocket of the pocket plate and engages a notch of the notch plate to thereby mechanically couple the pocket plate and the notch plate together to prevent relative rotation of the pocket plate and the notch plate with respect to each other about a common rotational axis and (ii) a disengaged position in which the locking member is disengaged from the notch of the notch plate to thereby mechanically decouple the pocket plate and the notch plate together to enable relative rotation of the pocket plate and the notch plate with respect to each other about the common rotational axis.

11 Claims, 14 Drawing Sheets

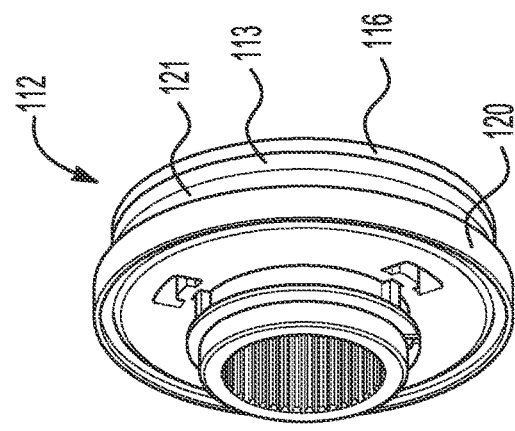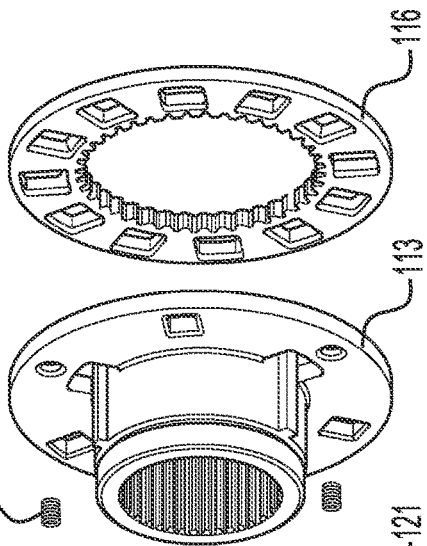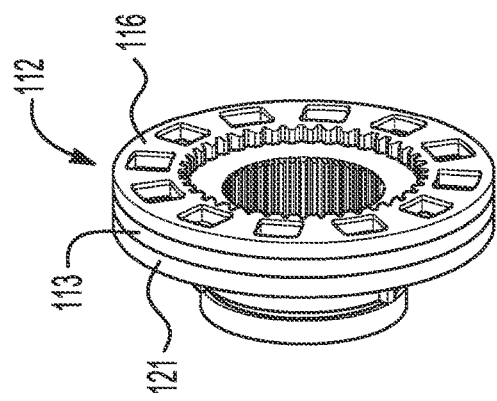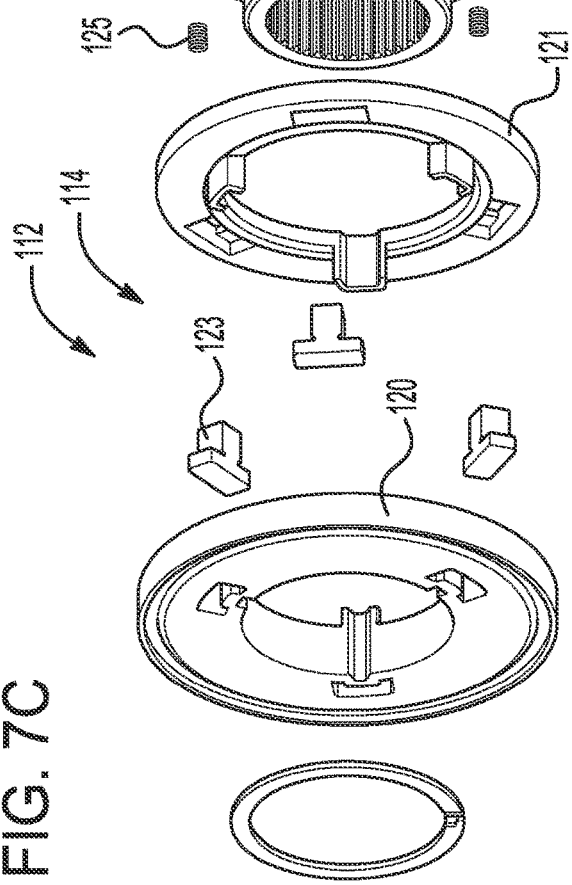
FIG. 7C
FIG. 7D
FIG. 7E

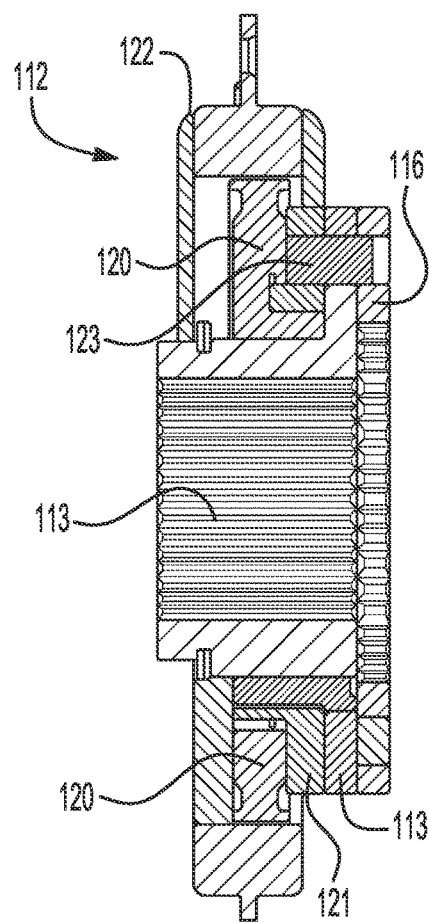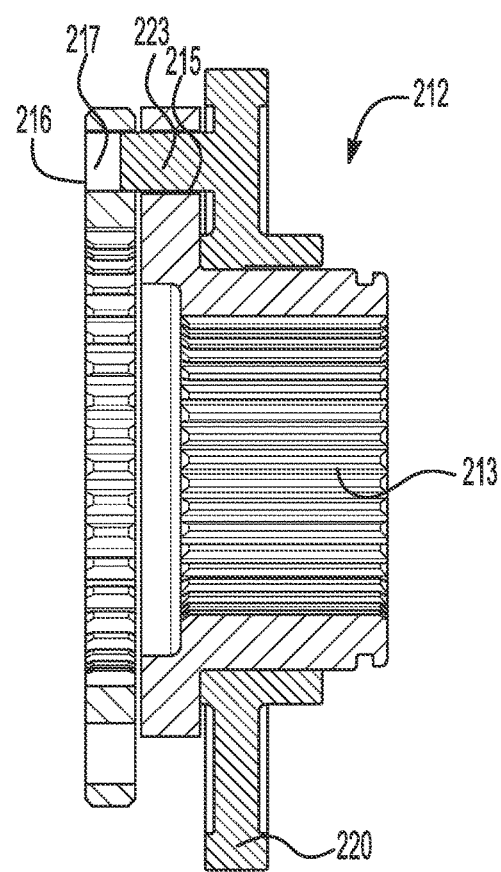
FIG. 8
FIG. 9A
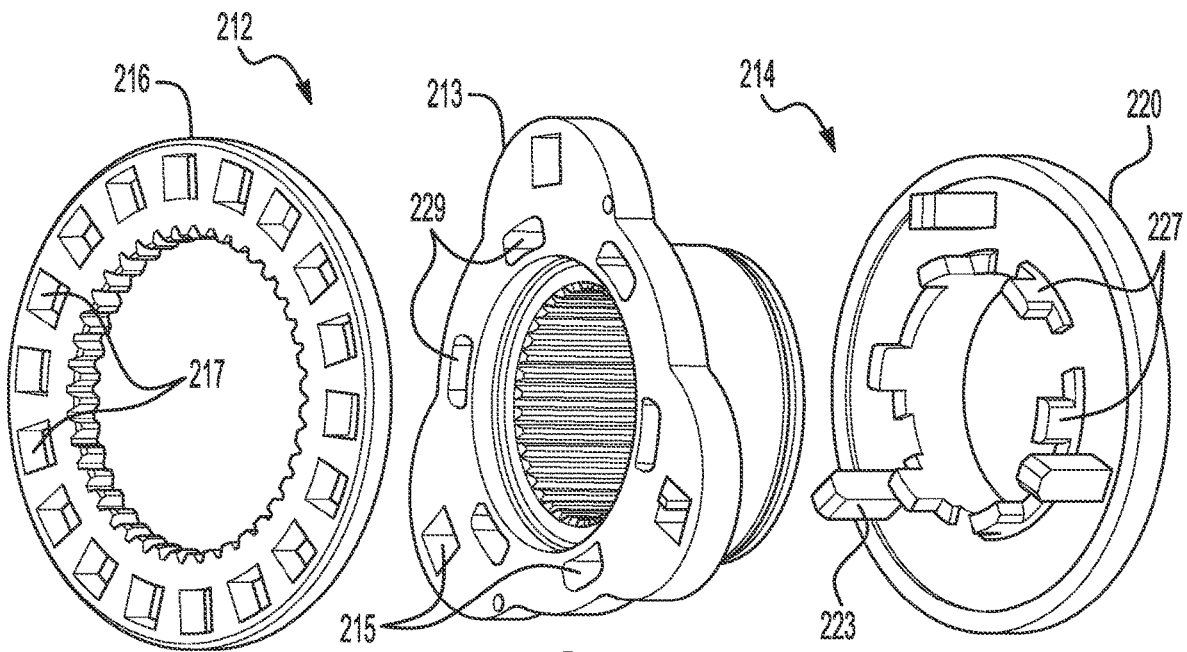
FIG. 9B

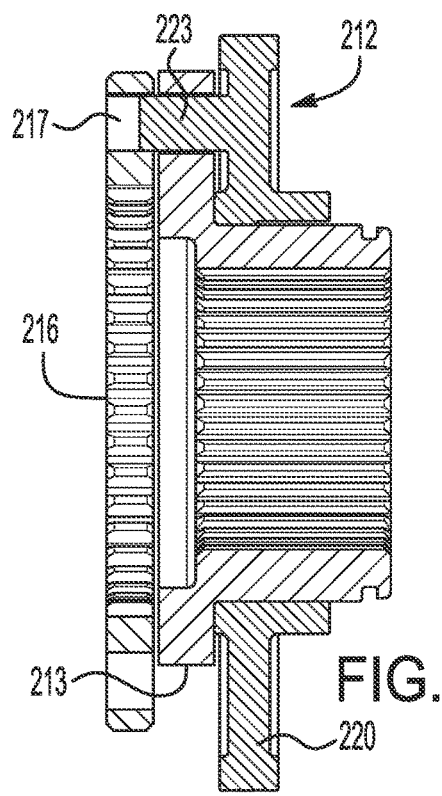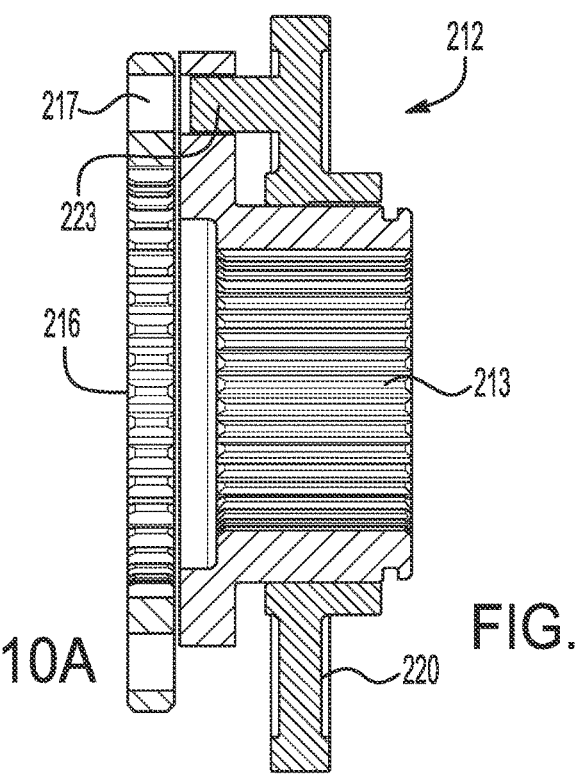
FIG. 10A  FIG. 10B
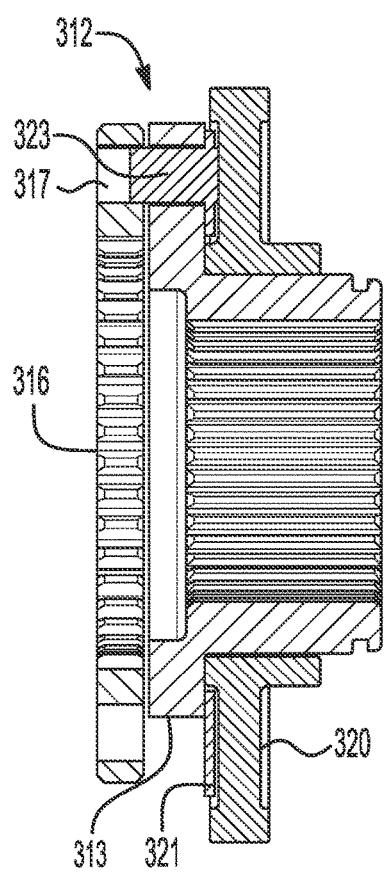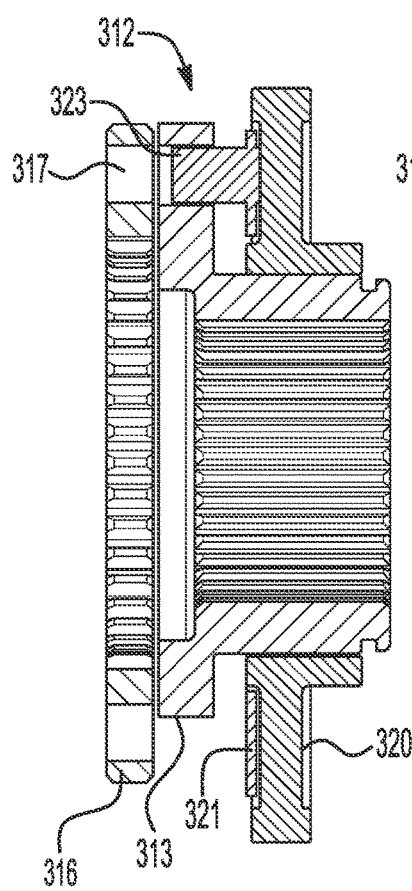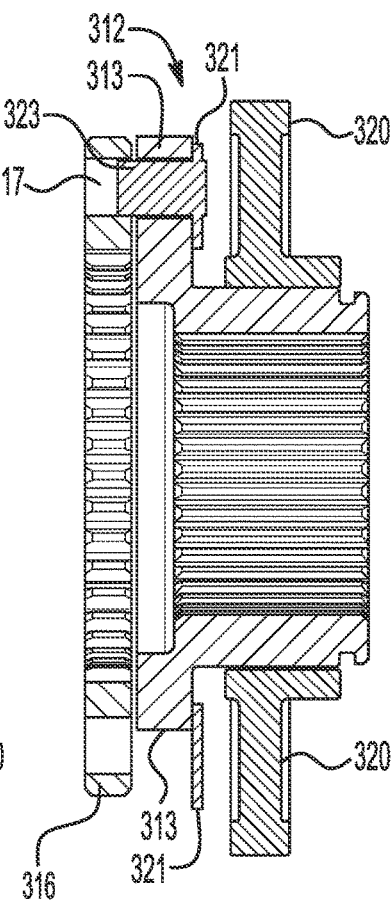
FIG. 11A  FIG. 11B  FIG. 11C

DYNAMIC CONTROLLABLE DOG CLUTCH

TECHNICAL FIELD

The present disclosure relates to dog clutches and to clutch assemblies having linear actuators for controlling and operating coupling members of the clutch assemblies.

BACKGROUND

A one-way clutch (OWC) includes a first coupling member (e.g., a pocket plate), a second coupling member (e.g., a notch plate), and locking members between opposing surfaces of the coupling members. The OWC locks in one direction and allows free rotation in the opposite direction.

A selectable or controllable OWC (also known as a two-way clutch) adds a second set of locking members in combination with a selector plate. The second set of locking members plus the selector plate adds multiple functions to the OWC. A selectable OWC can produce a mechanical connection between rotating or stationary shafts in one or both directions and can overrun in one or both directions. A selectable OWC contains an externally controlled selection mechanism for adjusting the selector plate corresponding to different operating modes of the selectable OWC.

A static, electrically actuated, selectable OWC provides benefits of latching in state and does not require a constant power supply. Two independent controllable locking elements respectively associated with two solenoids replace the two sets of locking members and the selector plate. One locking element is used to transmit torque in one direction (e.g., clockwise (CW)) and the other locking element is used to transmit torque in the opposite direction (e.g., counter-clockwise (CCW)). The solenoids respectively control the locking elements. Independent control of each solenoid allows torque transmission in the CW direction and freewheeling in the CCW direction, and vice versa. Simultaneously engaging both solenoids creates a clutch brake function. The solenoids are bi-stable, meaning they latch in state which eliminates constant power demand. Once a locking element engages, power is removed and magnets in the solenoid hold a solenoid plunger acting on the locking element in place.

A dog clutch includes a first coupling member having protrusions and a second coupling member having identical recesses. The protrusions and the recesses are mated, such as by moving the first coupling member in contact with the second coupling member, for the dog clutch to be engaged. The protrusions and the recesses are unmated, such as by moving the first coupling member away from the second coupling member, for the dog clutch to be disengaged.

Dog clutches have two basic types. In one type of dog clutch, the coupling members are collars that are slidable relative to one another. In another type of dog clutch, the coupling members are abutting faces that are movable relative to one another.

Referring now to FIGS. 1, 2, 3, 4, 5, 6A, and 6B, a clutch assembly having a dynamic controllable clutch (DCC) 12 in accordance with the prior art will be described. The DCC 12 has a radially inner rotating race, i.e., a first coupling member in the form of a pocket plate 13 (shown in FIGS. 4 and 5), and a radially outer rotating race, i.e., a second coupling member in the form of a notch plate 16. The pocket plate 13 contains one set of radial locking elements 26 for CW engagement and another set of radial locking elements 26 for CCW engagement. During engagement, at least one of the sets of locking elements 26 simultaneously contact pocket and notch engagement faces of the pocket and notch plates 13 and 16, respectively, which allows the DCC 12 to transmit torque.

The DCC 12 is electrically actuated by an actuation system in the form of a linear motor ("linear actuator") 14. The linear actuator 14 can control the locking elements 26 while the pocket plate 13 and/or the notch plate 16 are rotating. The linear actuator 14 includes a stator 22 and a translator 20.

The stator 22 is stationary and is fixed to the transmission case (not shown) via mounts 47. The stator 22 includes a pair of copper wire induction coils 44 and 46 and steel plates 48, 50, and 52. The steel plates 48, 50, and 52 provide or define a housing for the stator coils 44 and 46. The stator coils 44 and 46 are wound in series with reversed polarity relative to one another (anti-series).

The translator 20 is linearly movable between lateral (i.e., axial) positions. The translator 20 is assembled to and rotates with the pocket plate 13. The translator 20 includes an annular ring of segmented permanent magnets 21, steel plates 23 and 25, and rigid plungers 30. The plungers 30 operate the locking elements 26. The plungers 30 extend through holes formed through a carriage 51 of the translator 20 and are biased by springs 34. The plungers 30 are threaded at their ends and secured within their holes by internally threaded nuts 35. Conical ends of the plungers 30 extend through apertures of a ring 55.

FIGS. 2, 3, 4, and 5 detail how the linear actuator 14 controls the locking elements 26. The plungers 30 within the translator 20 directly contact the locking elements 26 and cause them to pitch up or pitch down depending on actuation direction. The linear actuator 14 has an "off" position (shown in FIGS. 2 and 4) and an "on" position (shown in FIGS. 3 and 5). The linear actuator 14 switches between the "off" and "on" positions by causing the translator 20 to laterally move between, in this case, a right-most position (shown in FIGS. 2 and 4) and a left-most position (shown in FIGS. 3 and 5).

When the translator 20 moves from "off" to "on", each plunger 30 contacts the under face or surface of its locking element 26 so it can engage the notch plate 16. The DCC 12 is able to transmit torque after the locking elements 26 are engaged. A return spring 28 under each locking element 26 is compressed during the engaged state. When commanded "off", the translator 20 moves back toward the "off" position and the plungers 30 lose contact with the locking elements 26. The return springs 28, which are compressed, create a force that causes the locking elements 26 to pitch downward or disengage. Once a torque reversal occurs, the locking elements 26 can disengage and the DCC 12 can freewheel.

To change state from "off" to "on", electrical current energizes the stator coil 46 nearest to the translator 20. The energized induction coil 46 produces a magnetic field which repels the steady state field generated by the permanent magnets 21 while the far stator coil 44 produces an attractive magnetic field. The combination of repelling and attracting forces caused by the stator coils 44 and 46 causes the translator 20 to move.

Once the translator 20 passes over the center stator steel plate 50, the permanent magnet 21 attempts to fully align the leftmost stator steel plate 48. A mechanical stop 53 (FIGS. 4 and 5) prevents full alignment, which results in a biasing force that holds the translator 20 in the "on" position. The translator 20 is magnetically latched in the "on" position.

Similar to a bi-stable solenoid, magnetic latching allows the electric power to be removed whenever the device is not actively changing position. The electrical current is turned "off" as change of state is achieved and is no longer needed. The magnetic latching force eliminates energy consumption during steady state conditions.

To disengage the DCC 12, current is applied to the stator coil 44 nearest to the translator 20 (formerly the far stator coil 46) and the linear actuator 14 moves from the "on" stop 53 to a ring which functions as an "off" stop 42 in a similar manner described above. The "off" mechanical stop 42 prevents full alignment of the permanent magnet 21 and the rightmost stator steel plate 52, remaining magnetically latched in the "off" position.

SUMMARY

A dynamic controllable dog clutch assembly includes a pocket plate and a notch plate axially facing and supported for rotation relative to one another about a common rotational axis, the pocket plate having at least one pocket and the notch plate having at least one notch. The DCDC further includes a linear actuator having a stator and a translator, the translator coupled to the pocket plate to rotate therewith. The translator is axially movable between (i) an engaged position in which a locking member axially extends through the at least one pocket of the pocket plate and engages the at least one notch of the notch plate to thereby mechanically couple the pocket plate and the notch plate together to prevent relative rotation of the pocket plate and the notch plate with respect to each other about the common rotational axis and (ii) a disengaged position in which the locking member is disengaged from the at least one notch of the notch plate to thereby mechanically decouple the pocket plate and the notch plate together to enable relative rotation of the pocket plate and the notch plate with respect to each other about the common rotational axis.

A dynamic controllable dog clutch assembly includes a pocket plate and a notch plate axially facing and supported for rotation relative to one another about a common rotational axis, the pocket plate having at least one pocket and the notch plate having at least one notch. The DCDC further includes a linear actuator having a stator, a translator, and a lug plate. The stator creates a magnetic flux when energized with electrical current. The translator and the lug plate are coupled to the pocket plate to rotate therewith. The lug plate includes or is coupled to an axially extending locking member and a return spring, and the lug plate is axially between the translator and the pocket plate. The translator is axially movable between (i) an engaged position in which the translator pushes the lug plate toward the pocket plate with the locking member axially extending through the at least one pocket of the pocket plate and engaging the at least one notch of the notch plate to thereby mechanically couple the pocket plate and the notch plate together to prevent relative rotation of the pocket plate and the notch plate with respect to each other about the common rotational axis and (ii) a disengaged position in which translator does not push the lug plate thereby enabling the return spring to push the lug plate away from the pocket plate with the locking member being disengaged from the at least one notch of the notch plate to thereby mechanically decouple the pocket plate and the notch plate together to enable relative rotation of the pocket plate and the notch plate with respect to each other about the common rotational axis.

A dynamic controllable dog clutch assembly includes a pocket plate and a notch plate axially facing and supported for rotation relative to one another about a common rotational axis, the pocket plate having at least one pocket and the notch plate having at least one notch. The DCDC further includes a linear actuator having a stator and a translator. The stator creates a magnetic flux when energized with electrical current. The translator is coupled to the pocket plate to rotate therewith. The translator is axially movable depending on the magnetic flux between (i) an engaged position in which a locking member axially extends through the at least one pocket of the pocket plate and engages the at least one notch of the notch plate to thereby mechanically couple the pocket plate and the notch plate together to prevent relative rotation of the pocket plate and the notch plate with respect to each other about the common rotational axis and (ii) a disengaged position in which the locking member is disengaged from the at least one notch of the notch plate to thereby mechanically decouple the pocket plate and the notch plate together to enable relative rotation of the pocket plate and the notch plate with respect to each other about the common rotational axis. The translator is axially moveable to the engaged position in response to the magnetic flux and axially moveable to the disengaged position as a result of one or more return springs biasing the pocket plate axially away from the translator.

BRIEF DESCRIPTION OF THE DRAWINGS

FIG. 7C illustrates a perspective view of the DCDC having the disclosed linear actuator with dog clutch in accordance with the first embodiment;

FIG. 7D illustrates an exploded view of the DCDC having the disclosed linear actuator with dog clutch in accordance with the first embodiment;

FIG. 7E illustrates a perspective view of the DCDC having the disclosed linear actuator with dog clutch in accordance with the first embodiment;

FIG. 8 illustrates a cross-sectional side view of the DCDC having the disclosed linear actuator with dog clutch in accordance with the first embodiment;

FIGS. 9A and 9B respectively illustrate a cross-sectional side view and an exploded view of the DCDC having the disclosed linear actuator with dog clutch in accordance with a second embodiment of the present disclosure;

FIGS. 10A and 10B respectively illustrate an engaged cross-sectional side view and a disengaged cross-sectional side view of the DCDC having the disclosed linear actuator with dog clutch in accordance with the second embodiment;

FIGS. 11A, 11B, and 11C respectively illustrate an engaged cross-sectional side view, a disengaged cross-sectional side view, and another engaged cross-sectional side view of the DCDC having the disclosed linear actuator with dog clutch in accordance with a third embodiment of the present disclosure;

DETAILED DESCRIPTION

Figure 1:
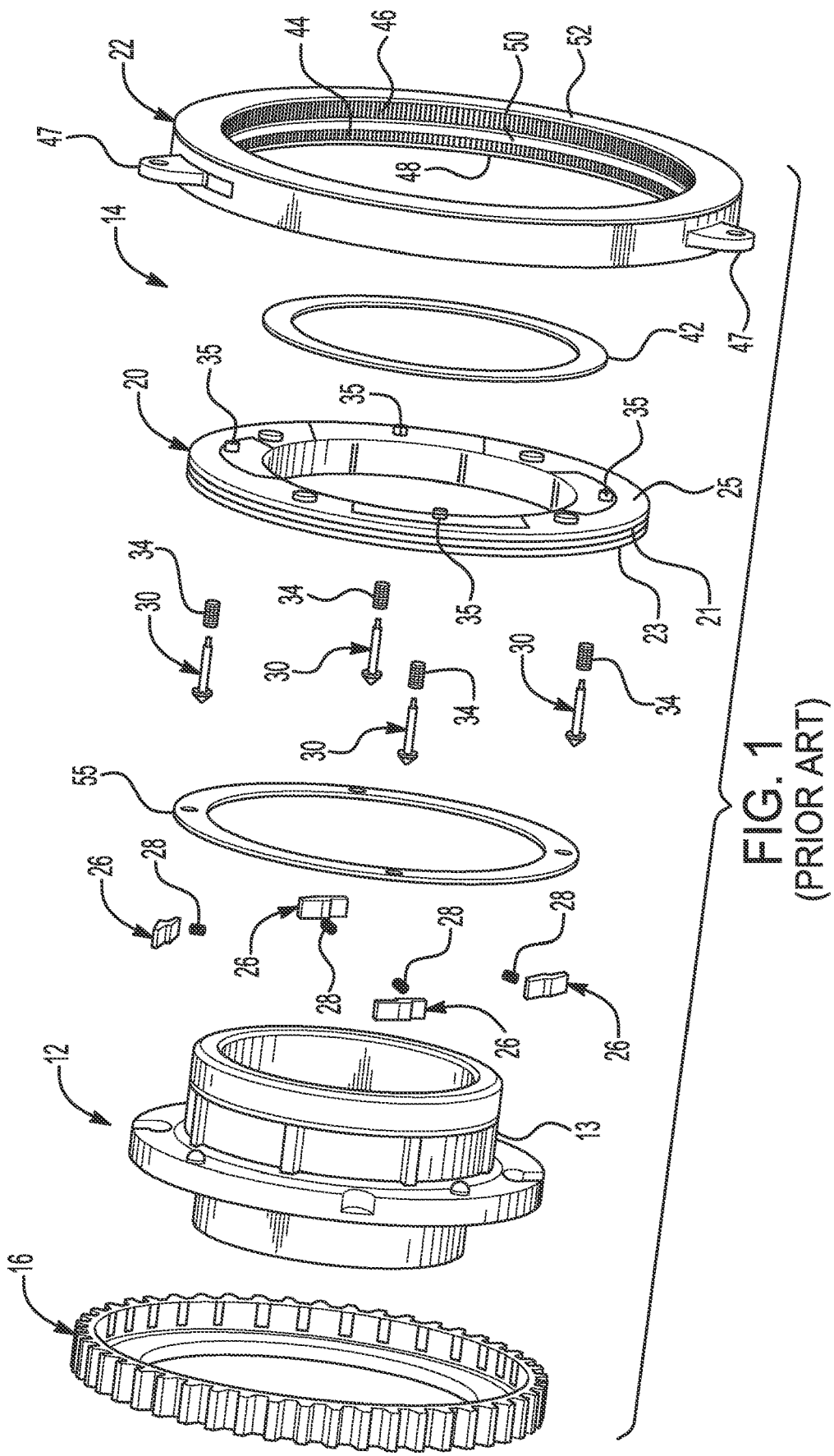
FIG. 1 is an exploded view of a dynamic controllable clutch (DCC) having a linear actuator in accordance with the prior art.
Figure 2:
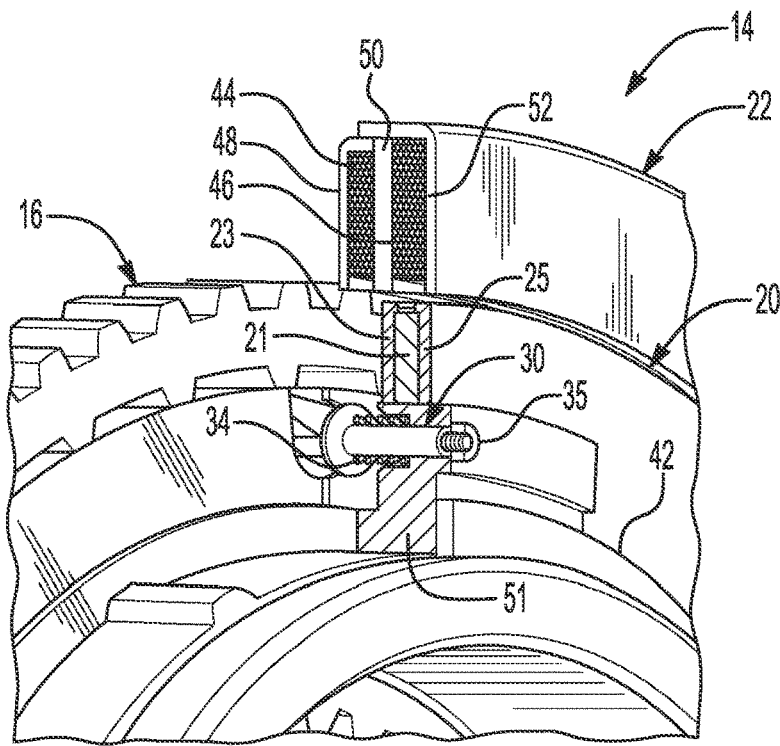
FIG. 2 is a perspective view, partially broken away and in cross section, of the prior art DCC with the linear actuator being in an "off" position whereby the DCC is in a free wheel mode.
Figure 3:
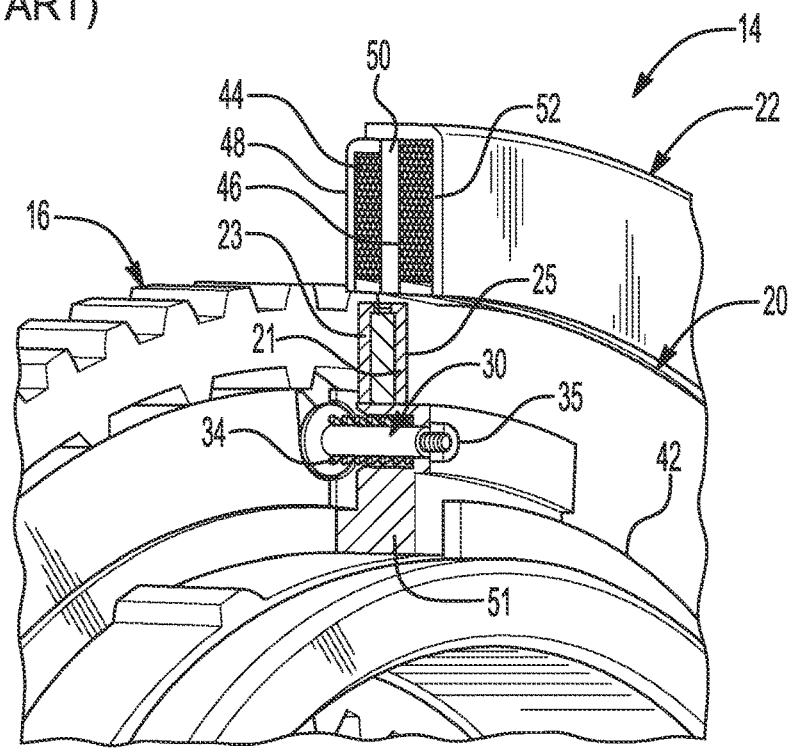
FIG. 3 is a perspective view, partially broken away and in cross section, of the prior art DCC with the linear actuator being in an "on" position whereby the DCC is in a lock mode.
Figure 4:
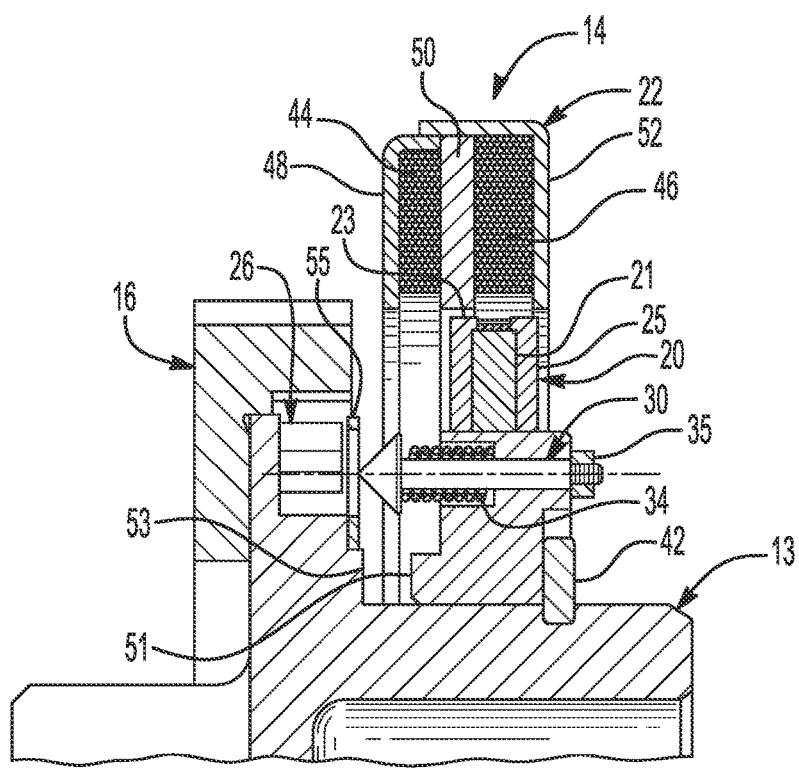
FIG. 4 is a side view, partially broken away and in cross section, of the prior art DCC with a translator of the linear actuator magnetically latched in the "off" position, wherein FIGS. 2 and 4 pertains to the same condition of the DCC.
Figure 5:
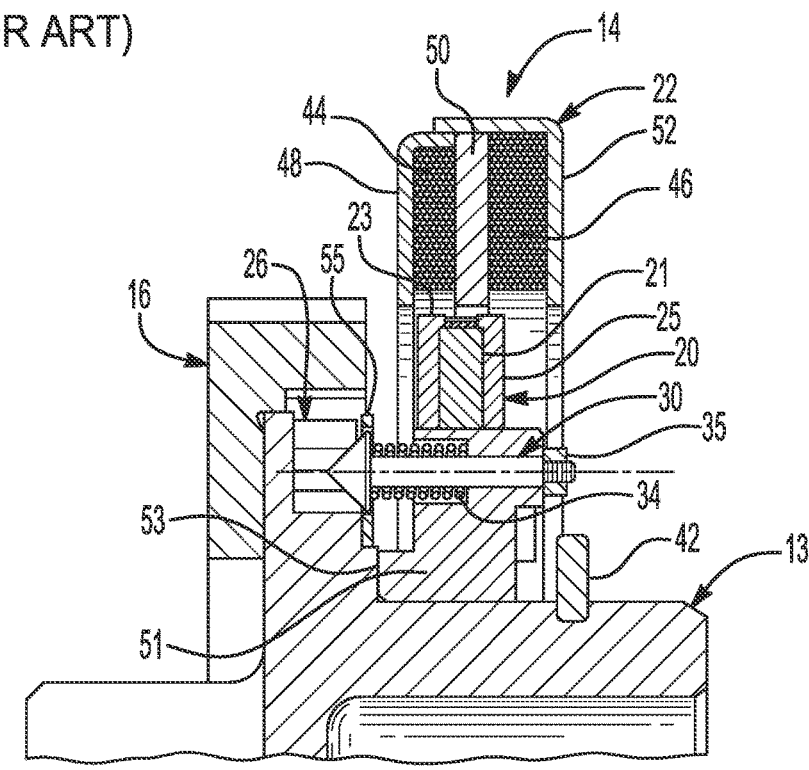
FIG. 5 is a side view, partially broken away and in cross section, of the prior art DCC with the translator of the linear actuator magnetically latched in the "on" position, wherein FIGS. 3 and 5 pertain to the same condition of the DCC.
Figure 6A:
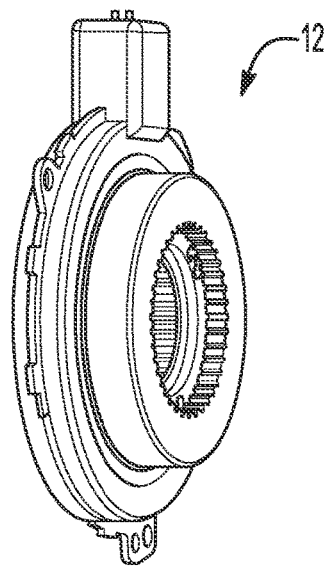
FIG. 6A and FIG. 6B respectively illustrate a perspective view and another exploded view of the prior art DCC.
Figure 6B:
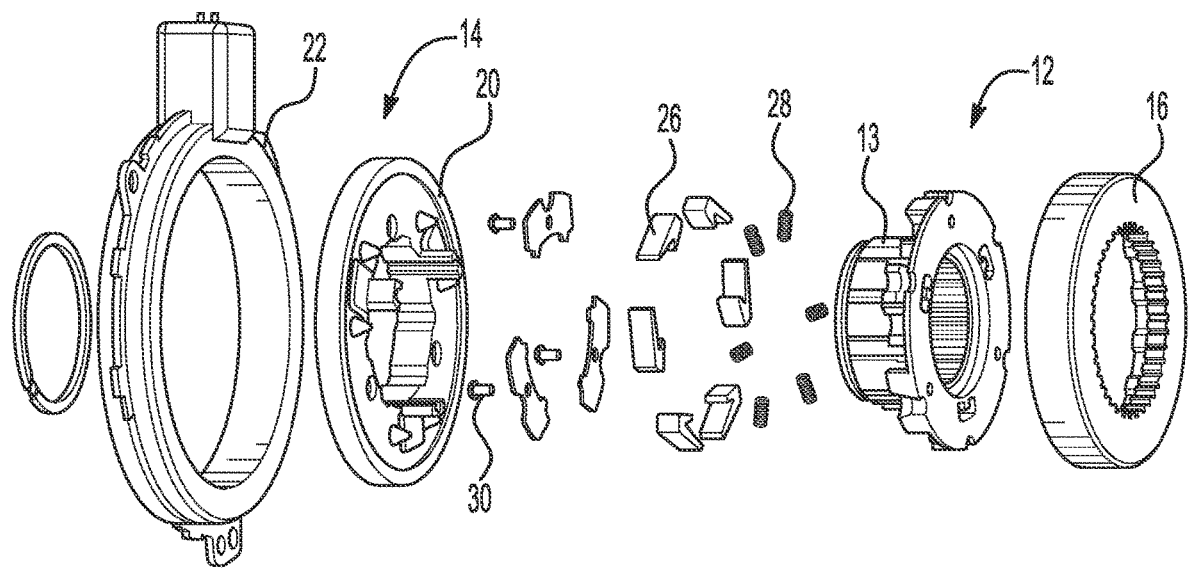

Detailed embodiments of the present disclosure are disclosed herein; however, it is to be understood that the detailed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Referring now to FIGS. 7A, 7B, 7C, 7D, 7E, and 8, a first embodiment of a dynamic controllable dog clutch (DCDC) 112 having a linear actuator with a dog clutch ("the disclosed linear actuator with dog clutch") is shown. The DCDC 112 includes a pocket plate 113, a notch plate 116, and a linear actuator 114 having a translator 120 (shown in FIGS. 7B, 7D, 7E, and 8) and a stator 122 (shown in FIGS. 7A, 7B, and 8). The translator 120 is linearly movable between lateral (i.e., axial) positions and the stator 122 is fixed in position. The stator 122 actuates and latches the translator 120 in either on or off position.

Per the disclosed linear actuator with dog clutch, the pocket plate 113 and the notch plate 116 are axially facing, the pocket plate 113 includes a set of axially oriented pockets 115, the notch plate 116 includes a set of axially oriented notches 117, and the linear actuator 114 further includes a lug plate 121, a set of (e.g., three) locking elements (e.g., lugs) 123, and a set of (e.g., three) return springs 125. The translator 120 and the lug plate 121 are assembled to and rotate with the pocket plate 113, with the lug plate 121 being axially between the translator 120 and the pocket plate 113. The springs 125 are biased to move the lug plate 121 away from the pocket plate 113 and thereby move the locking elements 123 away from the notches 117 of the notch plate 116.

Figure 7A:
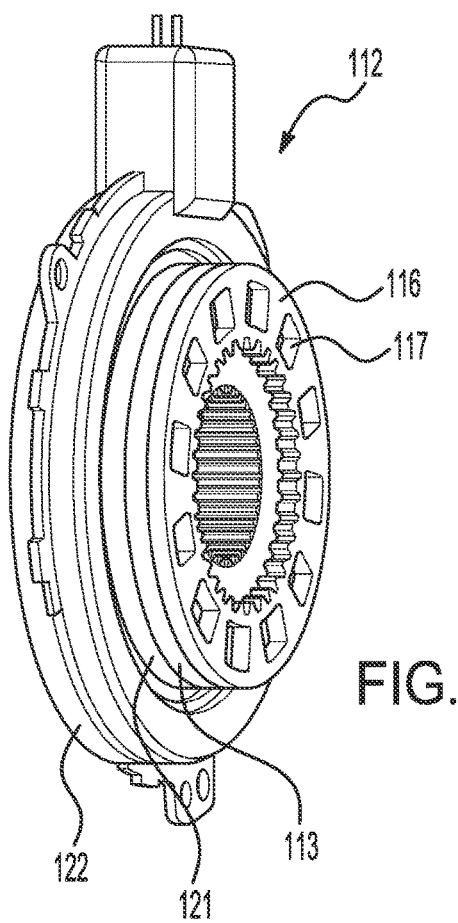
FIG. 7A illustrates a perspective view of a dynamic controllable dog clutch (DCDC) having a linear actuator with a dog clutch ("the disclosed linear actuator with dog clutch") in accordance with a first embodiment of the present disclosure.
Figure 7B:
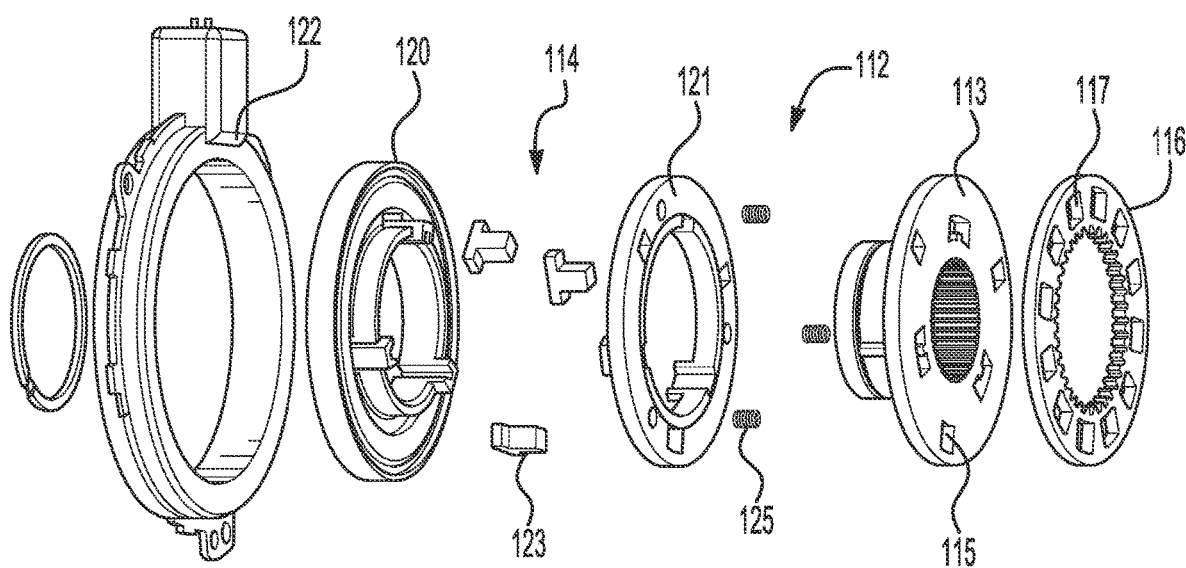
FIG. 7B illustrates an exploded view of the DCDC having the disclosed linear actuator with dog clutch in accordance with the first embodiment.

The translator 120 is movable toward the pocket plate 113 to an engaged ("on") position of the DCDC 112 and away from the pocket plate 113 to a disengaged ("off") position of the DCDC 112. The translator 120 in moving to the engaged position overcomes the force of the springs 125 and moves the lug plate 121 to be positioned adjacent to the pocket plate 113. In the engaged position, the locking elements 123 extend through the pockets 115 of the pocket plate 113 and engage the notches 117 of the notch plate 116, which allows the DCDC 112 to transmit torque. The translator 120 in moving to the disengaged position enables the springs 125 to move the lug plate 121 to be positioned away from the pocket plate 113. In the disengaged position, the locking elements 123 do not extend through the pockets 115 of the pocket plate 113 and thereby do not engage the notches 117 of the notch plate 116 (instead, the locking elements 123 extend into the pockets 115 but do not extend through the pockets 115 and into the notches 117 of the notch plate 116). With reference to FIG. 7B, the DCDC 112 having the disclosed linear actuator with dog clutch has no struts like the struts 26 of the prior art DCC 12 and no separating loads but does have the return springs 125. The DCDC 112 has three load carrying elements and has low force actuation at any speed. The engagement of the DCDC 112 is the same as the engagement of a solid plunger radial DCDC like the prior art DCC 12. The disengagement of the DCDC 112 is also the same as the disengagement of a solid plunger radial DCDC like the prior art DCC 12. The DCDC 112 has ratchet ability (functional safety) and low latching requirement.

Further information regarding the DCDC 112 having disclosed linear actuator with dog clutch includes the following. Garage shifts: radial DCDCs with solid plungers achieve this through the "spring" that the linear actuator provides; the translator can "stage" itself and fall into the lock position when ready. If the passive latch cross-over point is before locking element to notch plate first point of contact, it will drop into the notch when able. Clutch state sensing: an issue with a DCC using a customary linear actor is sensing when the clutch is 'open' vs 'closed'; a sensor on the lug plate 121 directly tells the state of the clutch (there is not a time when the lug plate 121 is in the off position while the clutch is still holding torque).

Referring now to FIGS. 9A, 9B, 10A, and 10B, a second embodiment of a DCDC 212 having the disclosed linear actuator with dog clutch is shown. The DCDC 212 includes a pocket plate 213, a notch plate 216, and a linear actuator 214 having a translator 220 and a stator (not shown). The side view of the DCDC 212 shown in FIG. 9A illustrates the DCDC 212 in its engaged position. Accordingly, as shown in FIG. 9A, each locking element 223 extends through a pocket 215 of the pocket plate 213 and engages a notch 217 of notch plate 216.

The notch plate 216 and the stator of the DCDC 212 are the same or similar to the notch plate 116 and the stator 122 of the DCDC 112. However, in the second embodiment, the translator 220 includes the set of locking elements 223 integrated thereon (i.e., locking elements 223 are directly attached to translator 220). Accordingly, the DCDC 212 does not include a lug plate, such as the lug plate 121, or return springs, such as the return springs 125. The translator 220 further includes connection tabs 227 integrated thereon. The pocket plate 213 further includes connection recesses 229. The connection tabs 227 of the translator 220 are engaged with respective connection recesses 229 of the pocket plate 213 to thereby connect the translator 220 and the pocket plate 213. Accordingly, the pocket plate 213 laterally moves in correspondence with lateral movement of the translator 220.

As described and illustrated, the DCDC 112 in the first embodiment, with reference to FIG. 7B, and the DCDC 212 in the second embodiment, with reference to FIG. 9B, each is a planar DCDC in which linear actuator meets dog clutch.

In the second embodiment, with reference to FIGS. 9A, 9B, 10A, and 10B, the DCDC 212 having the disclosed linear actuator with dog clutch has no springs like the springs 125 of the DCDC 112, no struts like the struts 26 of the prior art DCC 12, and no separating loads. Referring specifically to FIGS. 10A and 10B, an engaged side view and a disengaged side view of the DCDC 212 having the disclosed linear actuator with dog clutch are shown, respectively. The DCDC 212 has three load carrying elements and has low force actuation at any speed. The engagement of the DCDC 212 is the same as the engagement of a solid plunger radial DCDC like the prior art DCC 12. The disengagement of the DCDC 212 requires off command while torque reversal. The DCDC 212 has ratchet ability (functional safety) and low latching requirement.

Further information regarding the DCDC 212 having the disclosed linear actuator with dog clutch includes the following. Garage shifts: radial DCDCs with solid plungers achieve this through the "spring" that the linear actuator provides; the translator can "stage" itself and fall into the lock position when ready. If the passive latch cross-over point is before locking element to notch plate first point of contact, it will drop into the notch when able. Disengagements: the fire off single should be fired off during a torque reversal; linear actuators move very fast, so this should not be an issue; with 8.5 ms linear actuator travel time and 2° transitional backlash, the max acceleration during the torque reversal is 9227 rpm/sec. Clutch state sensing: an issue with a DCDC using a customary linear actuator is sensing when the clutch is 'open' vs 'closed'; a sensor on the translator 220 directly tells the state of the clutch (there is not a time when the translator 220 is in the off position while the clutch is still holding torque).

Referring now to FIGS. 11A, 11B, and 11C, an engaged side view (FIG. 11A), a disengaged side view (FIG. 11B), and another engaged view (FIG. 11C) of a DCDC 312 having a linear actuator with dog clutch are shown. The DCDC 312 may further include a mechanical "push" spring between a pocket plate 313 and a lug plate 321 to aid in disengagement and/or a magnetic "pull" spring between a translator 320 and the lug plate 321 to aid in disengagement. The DCDC 312 also includes a notch plate 316 having notches 317.

Figure 12:
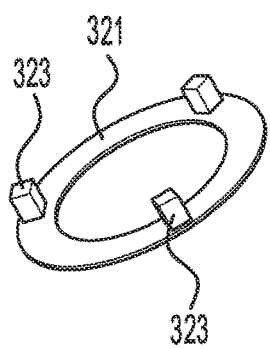
FIG. 12 illustrates a lug plate that is used as a part of the DCDC in accordance with the third embodiment.

Referring now to FIG. 12, with continual reference to FIGS. 11A, 11B, 11C, the lug plate 321 is shown, which includes three locking elements 323 that project axially from a face of the lug plate 321. The three locking elements 323 are integrally formed with the lug plate 321, at least in some implementations.

Figure 13A:
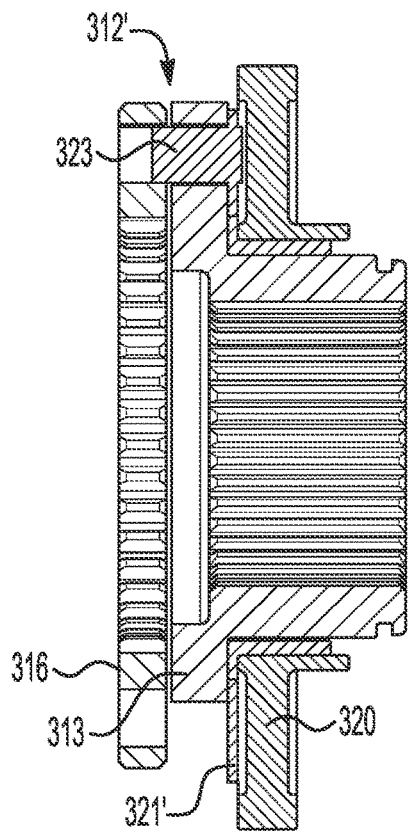
FIGS. 13A, 13B, and 13C respectively illustrate an engaged cross-sectional side view, a disengaged cross-sectional side view, and another engaged cross-sectional view of the DCDC having the disclosed linear actuator with dog clutch in accordance with a variation of the third embodiment.
Figure 13B:
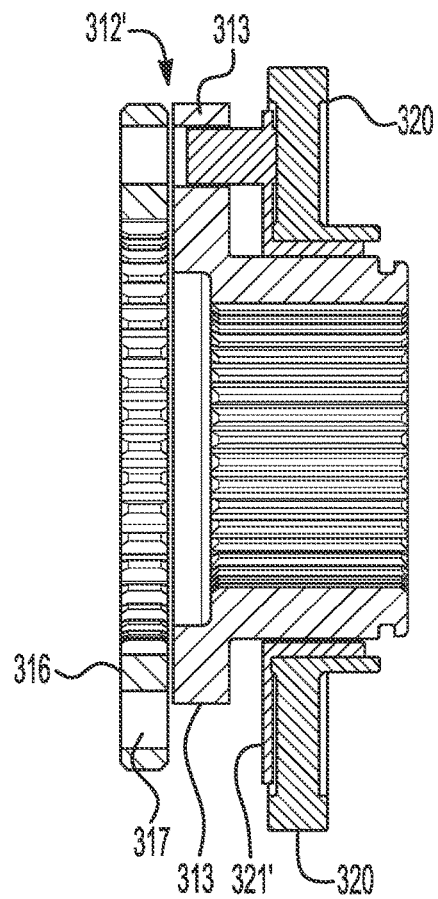
Figure 13C:
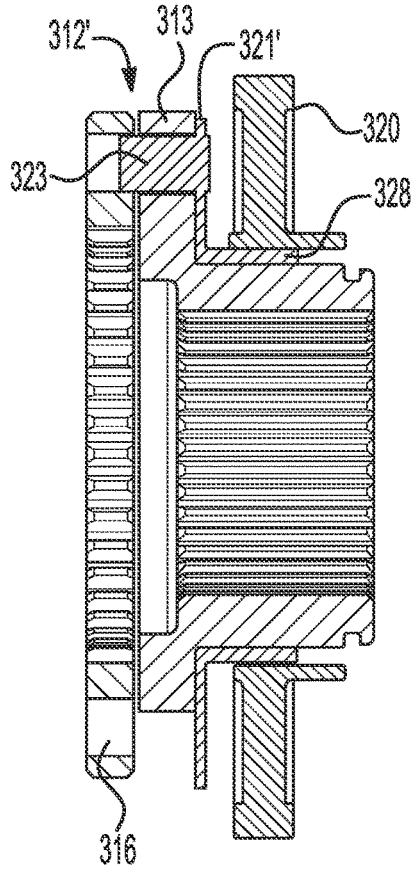

Referring now to FIGS. 13A, 13B, and 13C, an engaged side view (FIG. 13A), a disengaged side view (FIG. 13B), and another engaged view (FIG. 13C) of a DCDC 312' having a linear actuator with dog clutch in accordance with a variation of the third embodiment are shown. In this variation, lug plate 321' is the same as the lug plate 321 of the DCDC 312, except that the lug plate 321' further includes an axially projecting hub 328, which may be cylindrical or frustoconical in shape. The hub 328 is radially sandwiched between the pocket plate 313 and the translator 320 as shown in each of the views of FIGS. 13A, 13B, and 13C.

Figure 14:
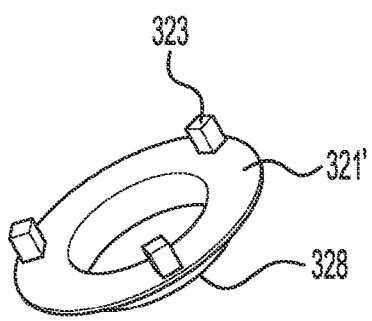
FIG. 14 illustrates a lug plate that is used as a part of the DCDC in accordance with the variation of the third embodiment that is shown in FIGS. 13A, 13B, and 13C.

Referring now to FIG. 14, with continual reference to FIGS. 13A, 13B, 13C, the lug plate 321' is shown, which includes the axially projecting hub 328 and three locking elements 323 that project axially from a face of the lug plate 321'. The three locking elements 323 are integrally formed with the lug plate 321', at least in some implementations.

Figure 15:
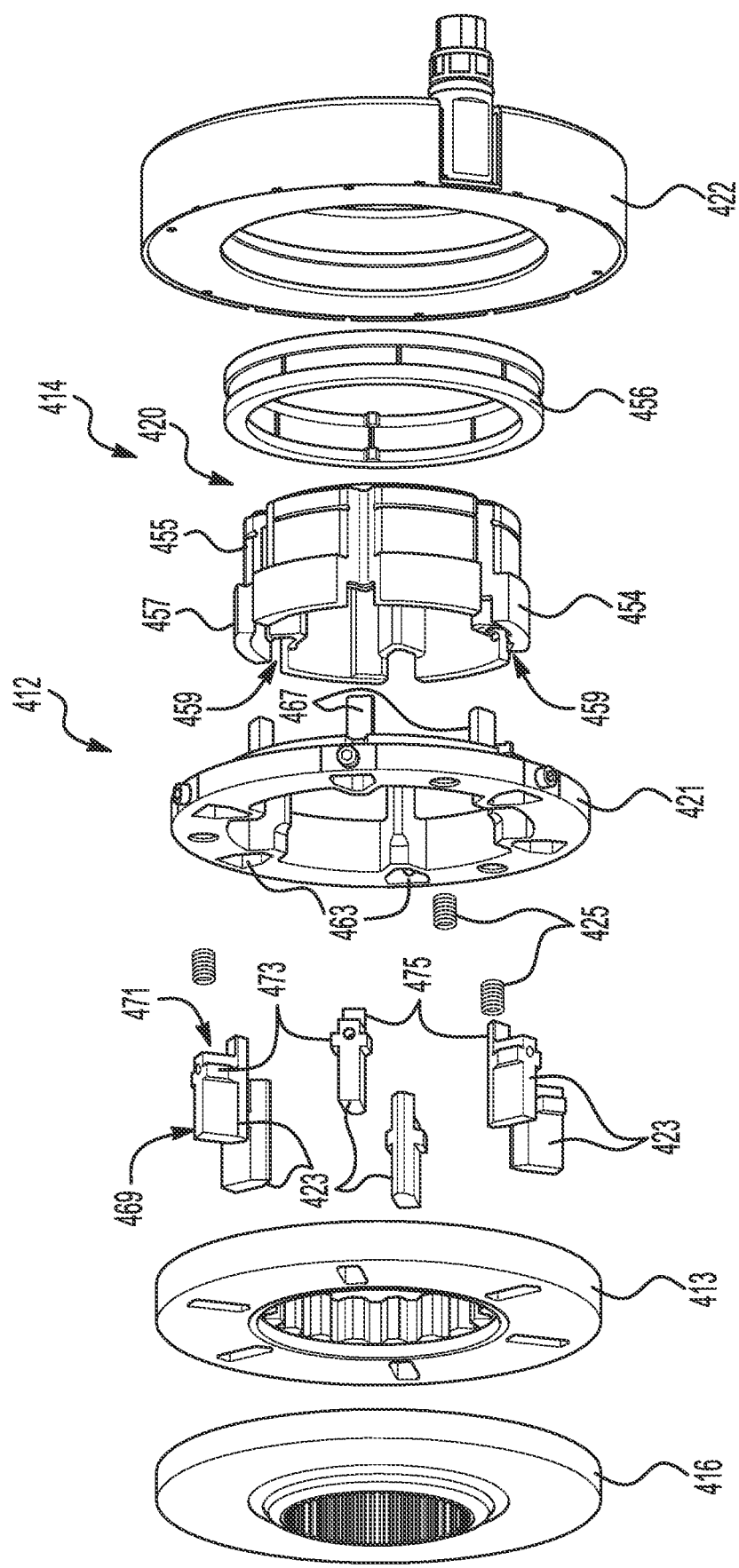
FIG. 15 illustrates an exploded view of the DCDC having the disclosed linear actuator with dog clutch in accordance with a fourth embodiment.
Figure 16:
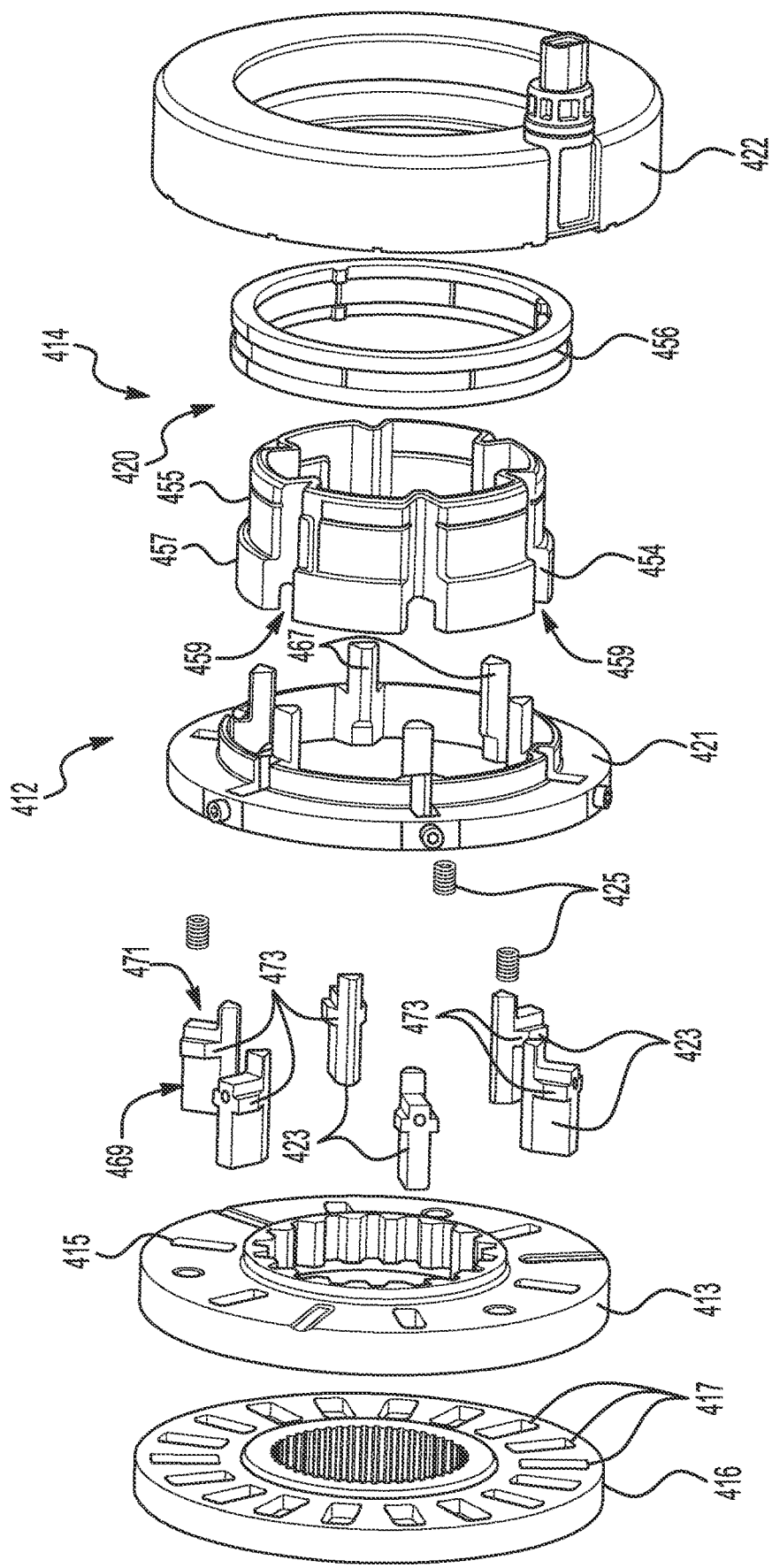
FIG. 16 illustrates an exploded view of the DCDC having the disclosed linear actuator with dog clutch in accordance with the fourth embodiment.

Referring now to FIGS. 15-16, an exploded view of a dynamic controllable dog clutch (DCDC) 412 having a linear actuator with a dog clutch ("the disclosed linear actuator with dog clutch") in accordance with a fourth embodiment of the present disclosure is shown. The DCDC 412 includes a pocket plate 413, a notch plate 416 having notches 417, a lug plate 421, locking elements 423, return springs 425, a linear actuator 414 having a translator 420 and a stator 422. The translator 420 includes a mechanical portion in the form of a guide collar 454 and an electrical portion in the form of an armature collar 456, and the translator 420 is linearly movable between lateral (i.e., axial) positions and the stator 422 is fixed in position. The stator 422 actuates and latches the translator 420 in either on or off position.

The guide collar 454 of the translator 420 includes a smaller diameter portion 455 that is carried radially within the armature collar 456 and a larger diameter portion 457 that has a larger diameter (i.e., larger radial extent) compared to the smaller diameter portion 455. The guide collar 454 is provided axially between the armature collar 456 and the lug plate 421 and the smaller diameter portion 455 is axially adjacent to the armature collar 456 and the larger diameter portion 457 is axially adjacent to the lug plate 421. A plurality of grooves 459 are defined by angled or chevron-shaped walls that extend radially inward from the larger diameter portion 457 and the smaller diameter portion 455. The lug plate 421 includes a plurality of slots 463 that have an opening provided within a first axially-facing surface of the lug plate 421. The slots 463 are each pentagonally shaped and, in particular, house-shaped pentagonal (i.e., a pentagon formed from a triangle with its hypotenuse on a side of a rectangle)—in the illustrated embodiment, a vertex of the pentagon is blunted flat. The slot 463 may be pentagonally-shaped completely therethrough or may change shape part way through the lug plate 421. The lug plate 421 also includes a plurality of guide posts or prongs 467 that are aligned with and configured to be received by the plurality of grooves 459 of the guide collar 454. The prongs 467 and grooves 459 may be correspondingly triangular-shaped or chevron-shaped in normal cross section. The plurality of grooves 459 may be spaced evenly about the common rotational axis and extend axially away from the second axially-facing surface of the lug plate 421. In the illustrated embodiment, there are six grooves 459, each of which engages one of the six prongs 467 of the lug plate 421.

Of course, in other embodiments, another suitable number of grooves and prongs can be used. Also, in some embodiments, including in the illustrated embodiment of FIGS. 15-16, the prongs 467 each correspond to a location at which one of the slots 463 is located. For example, an inner surface of each of the slots 463 constitutes or merges into an outer surface of a corresponding one of the prongs 467.

The locking elements 423 are separate pieces that are not formed as a part of a plate, such as being formed and integral with the lug plate 421 or the translator 420, but are separate components that are disposed between the lug plate 421 and the pocket plate 413. The locking elements 423 each includes a pocket plate engaging portion 469 that engages a corresponding slot 463 of the lug plate 421 at a first axial end and a lug plate engaging portion 471 that engages an axially-oriented pocket 415 of the pocket plate 413 at a second axial end. The pocket plate engaging portion 469 is axially-elongated in that it extends axially away from the lug plate engaging portion 471. The locking elements 423 each include two flanges or ears 473 that extend outward and perpendicularly from an outer side surface of the locking element 423. The flanges 473 are configured to be seated against corresponding shoulders within a corresponding slot 463 of the lug plate 421 to axially locate the locking elements 423 with respect to the lug plate 421. The lug plate engaging portion 471 also includes an axially-extended portion 475 that extends axially beyond the flanges 473 and into engagement with a slot in a hub extending axially away from a flange of the lug plate 421. A plurality of fasteners may be circumferentially aligned with the slots 463 of the lug plate 421 and may extend radially through the flange of the lug plate 421 and into engagement with radially outer portions of the locking elements 423 to retain the locking elements 423 to the lug plate 421.

In the engaged position, the locking elements 423 extend through the axially-oriented pockets 415 and into the notches 417 of the notch plate 416. The axially-oriented pockets 415 of the pocket plate 413 are each radially oblong slots or passages that extend axially though the pocket plate 413. The radially oblong shape of the pockets 415 corresponds to the cross-sectional shape of the pocket plate engaging portion 469. The notches 417 of the notch plate 416 are similarly shaped—i.e., are radially oblong. As shown in the illustrated embodiment, there may be a fair number of notches 417 (e.g., 18 notches as shown in FIG. 16); however, any suitable number may be used. The return springs 425 are disposed between the lug plate 421 and the pocket plate 413 and are configured so as to force the lug plate 421 away from the pocket plate 413. The depicted embodiment includes three return springs 425, however, any suitable number may be used. The return springs 425 are each associated with a corresponding recess that is disposed within an axial face of the lug plate 421 that faces the pocket plate 413. The pockets 415 and notches 417 in the pocket plate and notch plate are configured to ensure that the springs 425 do not fly out due to centrifugal forces while the plates 413, 416 rotate. The pockets 415 and notches 417 are also configured to allow for reduction of axial space when compared to using posts instead of recesses to retain the return springs 425. Preferably, the springs 425 should not be compressed to solid height, which may also dictate design of the plates 413, 416.

In embodiments, the translator 120, 220, 320, 420 is actuated to engage the clutch to hold torque in some manner. For example, with reference to FIGS. 10A and 10B, the translator 220 is actuated to the left. Current is supplied to the stator 122 (not shown in the second or third embodiments) which actuates the translator 120, 220, 320, 420 to the left. If tooth-butt exists (i.e., if the locking member 123, 223, 323, 423 cannot fall into a notch 117, 217, 317, 417 of the notch plate 116, 216, 316, 416), then the passive latch from the linear actuator 114, 214, 314, 414 is strong enough to provide rest of the translator 120, 220, 320, 420 travel to ensure full depth engagement.

Firing off which would disengage the clutch is slightly different for different embodiments. For example, with respect to the DCDC 112, firing off occurs by supplying current to the stator 122 which would actuate the translator 120 to the right regardless if the clutch was holding torque or not. When the clutch releases torque, the return springs 125 between the translator 120 and the lug plate 121 would push the translator 120 to the disengaged position. And, with respect to the DCDC 212, firing off occurs by supplying current to the stator during a torque reversal since this design cannot disengage while holding torque. It is noted that the linear actuator 214 used for this clutch offers a spring force between the translator 220 and the stator, and embodiments of the present disclosure utilize that to fire in the on direction.

Figure 17A:
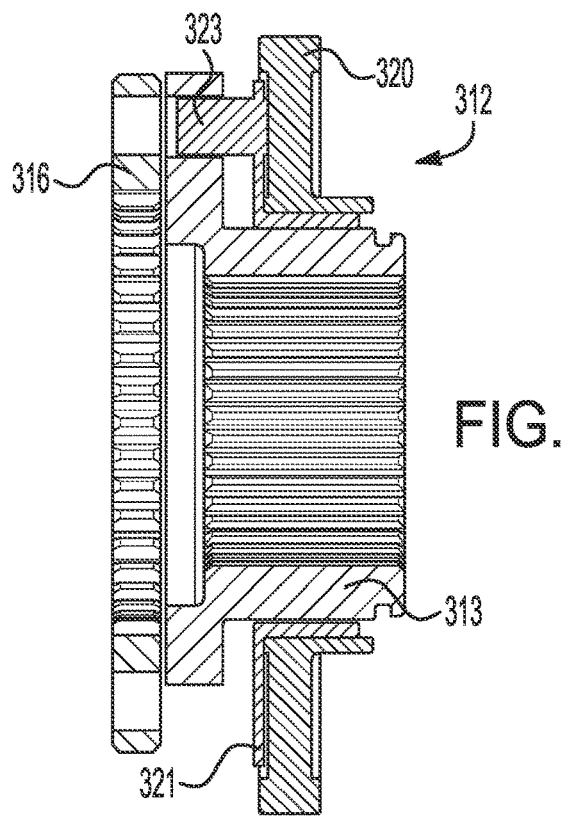
FIGS. 17A, 17B, and 17C respectively illustrate side views of the DCDC having the disclosed linear actuator with dog clutch in accordance with the third embodiment being moved from the disengaged position to the engaged position.
Figure 17B:
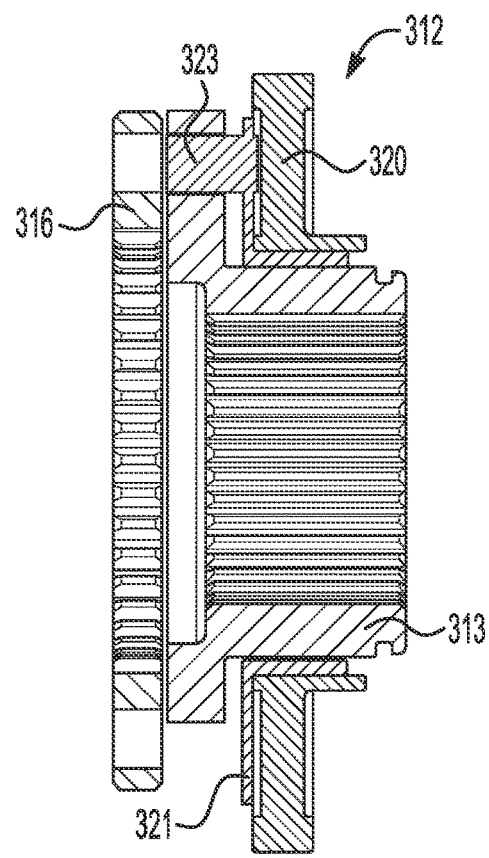
Figure 17C:
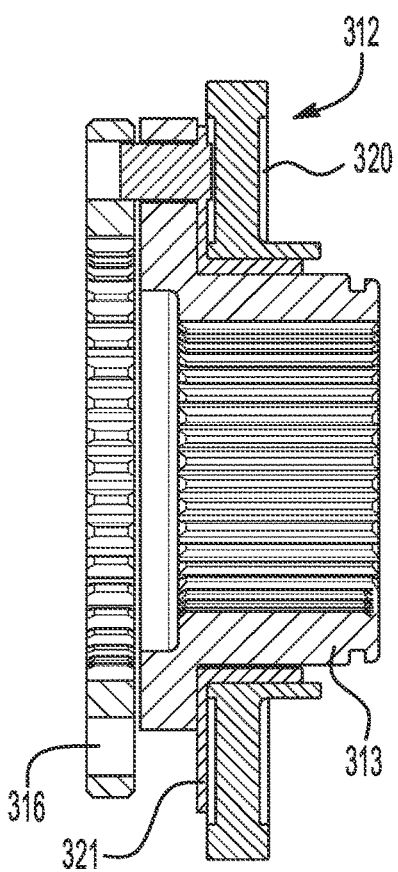

Referring now to FIGS. 17A, 17B, and 17C, side views of the DCDC 312 being moved from the disengaged position to the engaged position are shown. The DCDC 312 begins in a disengaged position. Current is supplied to the stator which actuates the translator 320 to the left. If in a tooth-butt state (FIG. 17B), then the linear actuator 314 provides the required spring force to actuate the translator 320 the rest of the way to an engaged state without the use of current.

Figure 18A:
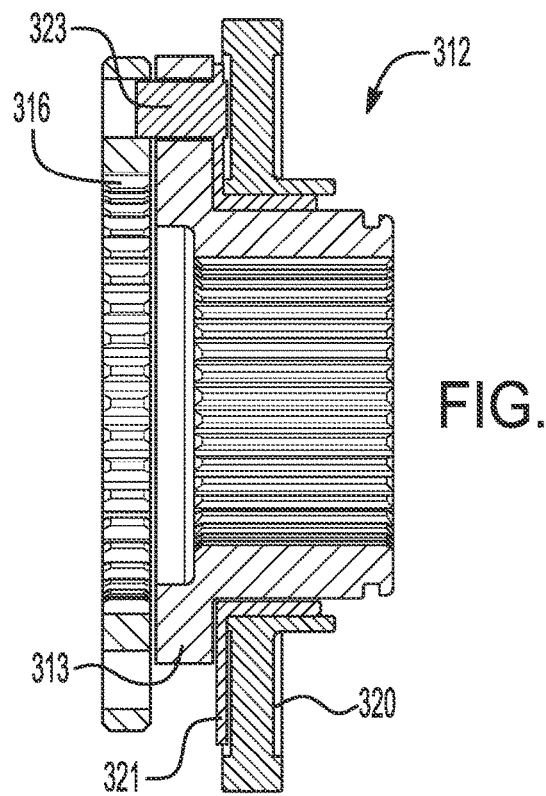
FIGS. 18A, 18B, and 18C respectively illustrate side views of the DCDC having the disclosed linear actuator with dog clutch in accordance with the third embodiment being moved from the engaged position to the disengaged position.
Figure 18B:
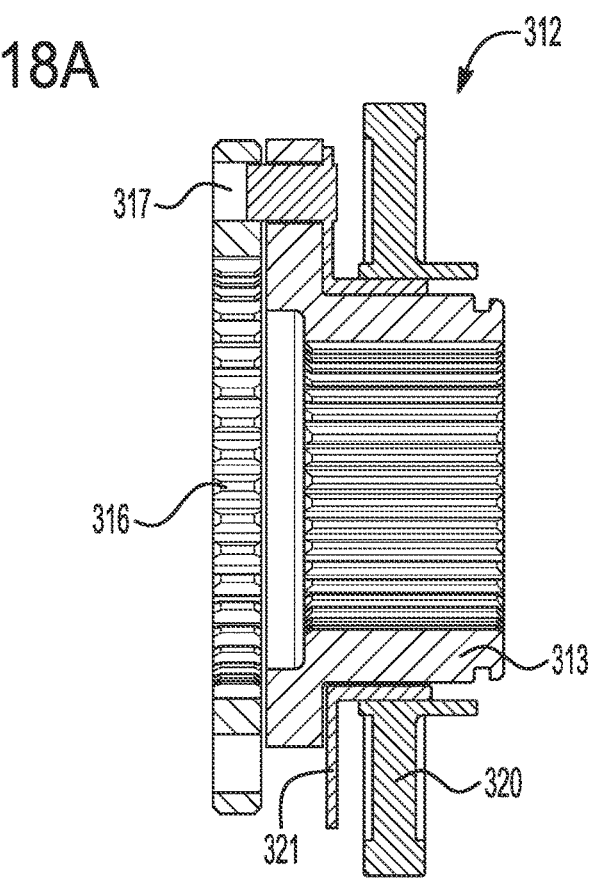
Figure 18C:
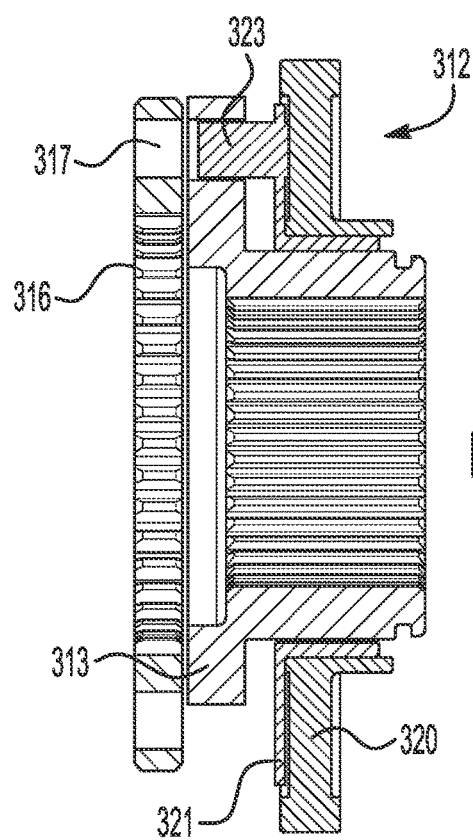

Referring now to FIGS. 18A, 18B, and 18C, side views of the DCDC 312 being moved from the engaged position to the disengaged position are shown. The DCDC 312 begins in an engaged position (FIG. 18A). Current is supplied to the stator which actuates the translator 320 to the right. If holding torque (FIG. 18B), then the springs 325 provide the required force to actuate the translator 320 the rest of the way to a disengaged position 3 without the use of current.

Figure 19:
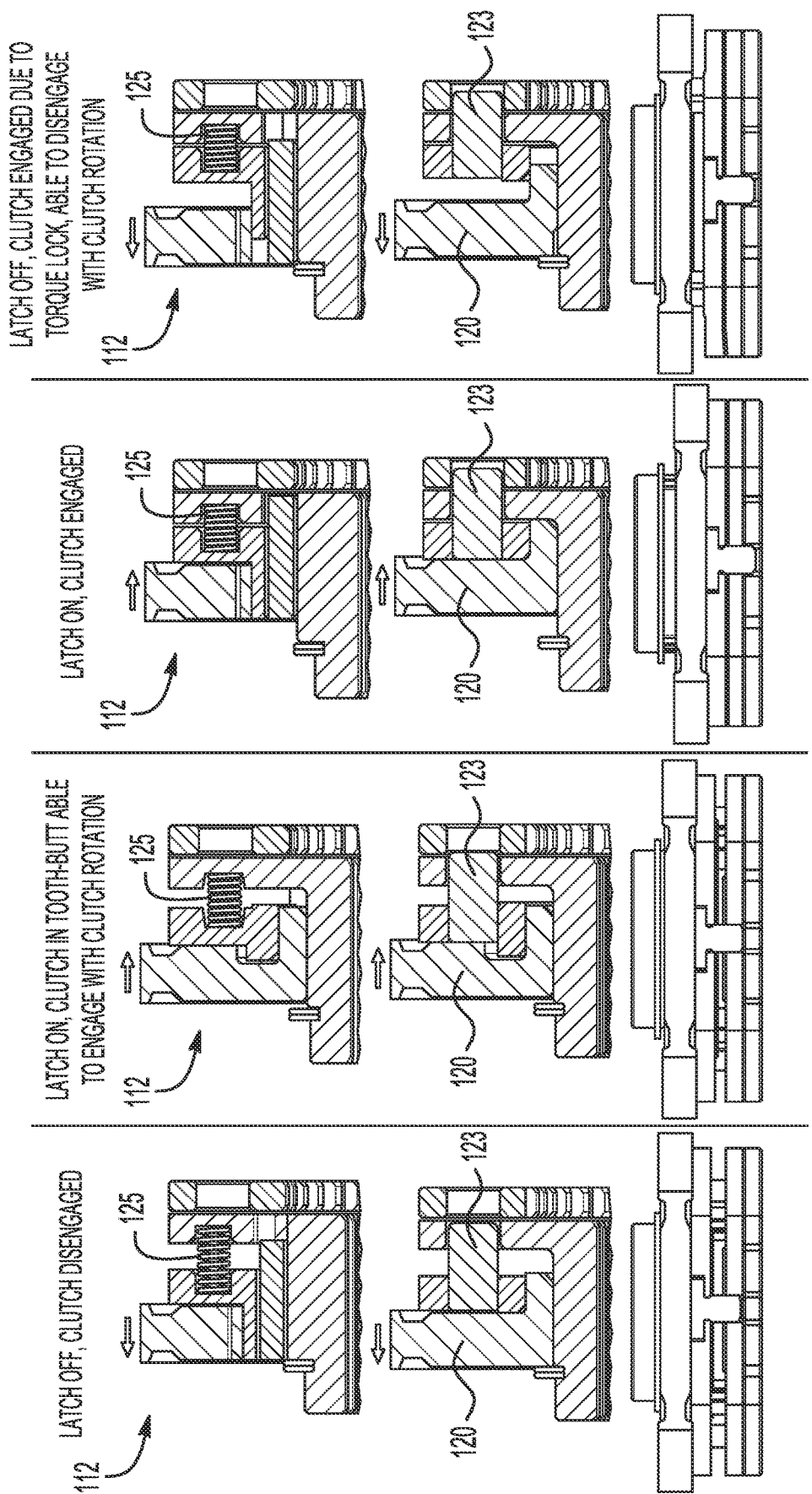
FIG. 19 illustrates three different views of the DCDC having the disclosed linear actuator with dog clutch in accordance with the first embodiment for each of four different states of the DCDC.

Referring now to FIG. 19, three different views of the DCDC 112 for each of four different states of the DCDC 112 are shown. As indicated in the text associated with FIG. 19, the four different states of the DCDC 112 include: state #1—Latch Off, Clutch Disengaged; state #2—Latch On, Clutch in Tooth-Butt Able to Engage with Clutch Rotation; State #3—Latch On, Clutch Engaged; and State #4—Latch Off, Clutch Engaged Due to Torque Lock, Able to Disengage with Clutch Rotation.

Finally, the subject matter of this application is presently disclosed in conjunction with several explicit illustrative embodiments and modifications to those embodiments, using various terms. All terms used herein are intended to be merely descriptive, rather than necessarily limiting, and are to be interpreted and construed in accordance with their ordinary and customary meaning in the art, unless used in a context that requires a different interpretation. And for the sake of expedience, each explicit illustrative embodiment and modification is hereby incorporated by reference into one or more of the other explicit illustrative embodiments and modifications. As such, many other embodiments, modifications, and equivalents thereto, either exist now or are yet to be discovered and, thus, it is neither intended nor possible to presently describe all such subject matter, which will readily be suggested to persons of ordinary skill in the art in view of the present disclosure. Rather, the present disclosure is intended to embrace all such embodiments and modifications of the subject matter of this application, and equivalents thereto, as fall within the broad scope of the accompanying claims.

What is claimed is:

1. A dynamic controllable dog clutch assembly comprising:
 a pocket plate and a notch plate axially facing and supported for rotation relative to one another about a common rotational axis, the pocket plate having at least one pocket and the notch plate having at least one notch; and
 a linear actuator having a stator and a translator, the translator coupled to the pocket plate to rotate therewith and having a hub extending axially, a plate extending transversely outwardly from the hub, and at least one locking member extending axially from the plate, wherein the hub, the plate, and the at least one locking member are unitary; and
 the translator being axially movable between (i) an engaged position in which the at least one locking member axially extends through the at least one pocket of the pocket plate and engages the at least one notch of the notch plate to thereby mechanically couple the pocket plate and the notch plate together to prevent relative rotation of the pocket plate and the notch plate with respect to each other about the common rotational axis and (ii) a disengaged position in which the at least one locking member is disengaged from the at least one notch of the notch plate to thereby mechanically decouple the pocket plate and the notch plate together to enable relative rotation of the pocket plate and the notch plate with respect to each other about the common rotational axis.

2. The dynamic controllable dog clutch assembly of claim 1, wherein the linear actuator has no springs.

3. The dynamic controllable dog clutch assembly of claim 1, wherein the pocket plate also has at least one connection recess and the translator also has at least one connection tab engaged with the at least one connection recess to connect the pocket plate to the translator so that the translator and the pocket plate laterally move together.

4. The dynamic controllable dog clutch assembly of claim 1, wherein the pocket plate has a pocket plate hub and a plate extending radially away from the pocket plate hub, and the hub of the translator is movably carried on the pocket plate hub.

5. The dynamic controllable dog clutch assembly of claim 4, wherein the at least one pocket includes three pockets, the at least one notch includes three notches, and the at least one locking member includes three locking members, and the plate of the pocket plate has three circumferentially spaced radially projecting lobes carrying the three pockets.

6. The dynamic controllable dog clutch assembly of claim 5, wherein the pocket plate also has at least three connection recesses circumferentially clocked with respect to the three pockets.

7. The dynamic controllable dog clutch assembly of claim 4, wherein the stator of the linear actuator is radially outward of and circumscribes an outer diameter of the translator.

8. The dynamic controllable dog clutch assembly of claim 1, wherein the pocket plate has a pocket plate hub having a pocket plate internal spline, and the notch plate has a notch plate internal spline having a greater inner diameter than that of the pocket plate internal spline.

9. The dynamic controllable dog clutch assembly of claim 1, wherein outer diameters of the pocket plate and the notch plate are coextensive.

10. The dynamic controllable dog clutch assembly of claim 1, wherein the notch plate has an outer diameter and the at least one notch includes a circumferential array of circumferentially closed through passages located radially inboard of the outer diameter.

11. The dynamic controllable dog clutch assembly of claim 1, wherein the at least one notch is circumferentially closed and wherein the at least one pocket is circumferentially closed.

\* \* \* \* \*